US012763718B2

(12) United States Patent
Wedding et al.

(10) Patent No.: US 12,763,718 B2
(45) Date of Patent: Oct. 13, 2026

(54) CABLE HANGER

(71) Applicant: Cambria County Association for the Blind & Handicapped, Johnstown, PA (US)

(72) Inventors: Timothy Joseph Wedding, Johnstown, PA (US); Paul Edward Martin, Johnstown, PA (US)

(73) Assignee: CAMBRIA COUNTY ASSOCIATION FOR THE BLIND AND HANDICAPPED, Johnstown, PA (US)

(*) Notice: Subject to any disclaimer, the term of this patent is extended or adjusted under 35 U.S.C. 154(b) by 0 days.

(21) Appl. No.: 18/379,319

(22) Filed: Oct. 12, 2023

(65) Prior Publication Data

US 2024/0039463 A1 Feb. 1, 2024

Related U.S. Application Data

(63) Continuation of application No. 17/389,949, filed on Jul. 30, 2021, now Pat. No. 11,817,817.

(60) Provisional application No. 63/058,910, filed on Jul. 30, 2020.

(51) Int. Cl.
*H02S 30/10* (2014.01)
*H02G 3/32* (2006.01)

(52) U.S. Cl.
CPC ............... *H02S 30/10* (2014.12); *H02G 3/32* (2013.01)

(58) Field of Classification Search
None
See application file for complete search history.

(56) References Cited

U.S. PATENT DOCUMENTS

| | | | | |
|---|---|---|---|---|
| 1,841,479 | A | 1/1932 | Jessen | |
| 6,254,050 | B1 | 7/2001 | Albrecht et al. | |
| 8,875,770 | B1 * | 11/2014 | Martin | A47K 3/38 160/124 |
| 9,706,859 | B2 * | 7/2017 | Brinton, Jr. | A47F 5/01 |
| 9,800,028 | B1 | 10/2017 | Smith et al. | |
| D919,417 | S | 5/2021 | Wedding et al. | |
| 11,002,463 | B2 | 5/2021 | Castelijn et al. | |
| D922,182 | S | 6/2021 | Wedding et al. | |
| D945,253 | S | 3/2022 | Stubben et al. | |
| D945,864 | S | 3/2022 | Stubben et al. | |
| 2010/0019105 | A1 * | 1/2010 | Bootsman | E02D 27/46 248/65 |
| 2015/0060627 | A1 * | 3/2015 | Stauber | A47G 1/164 248/475.1 |
| 2016/0153587 | A1 | 6/2016 | Smith et al. | |
| 2016/0258554 | A1 | 9/2016 | Ripoll Agullo et al. | |
| 2017/0261127 | A1 * | 9/2017 | Wolff | F16L 3/13 |
| 2018/0347727 | A1 | 12/2018 | Shea et al. | |
| 2020/0103101 | A1 * | 4/2020 | Jones | F21V 21/08 |
| 2020/0403390 | A1 * | 12/2020 | Jette | H02S 40/30 |
| 2022/0074522 | A1 * | 3/2022 | Stubben | F16B 2/248 |
| 2022/0216678 | A1 | 7/2022 | Anderson et al. | |

* cited by examiner

*Primary Examiner* — Steven M Marsh
(74) *Attorney, Agent, or Firm* — Eckert Seamans Cherin & Mellott, LLC

(57) ABSTRACT

A cable hanger including a body defining a support coupling and a number of supported element couplings. The support coupling is a rigid element support coupling.

15 Claims, 12 Drawing Sheets

CABLE HANGER

CROSS REFERENCE TO RELATED APPLICATION

This application is a continuation application of and claims priority to U.S. patent application Ser. No. 17/389,949, filed Jul. 30, 2021, which application claims priority to U.S. Provisional Patent Application Ser. No. 63/058,910, filed Jul. 30, 2020, the contents of which are incorporated by reference herein.

BACKGROUND OF THE INVENTION

Field of the Invention

The disclosed and claimed concept relates to a cable hanger and, more specifically, to a cable hanger including a rigid element support coupling. The disclosed and claimed concept also relates to a solar array having a plurality of such cable hangers.

Background Information

Lines, wire and/or cables (hereinafter and collectively, "lines") have long been used to conduct electricity. For example, power lines conduct electricity for powering homes and businesses while telephone lines conduct electricity in the form of electrical signals. Regardless of the purpose of the line it is known that the line should not be disposed on the ground where it may be damaged. Some lines are buried while other lines are elevated and supported by poles, towers or similar constructs. As is well known, elevated lines are typically elevated to a height above fifteen feet so that the line is above the height of people and most vehicles. Thus, the pole/tower for elevated lines is typically taller than fifteen feet. In some locations, however, burying or elevating the line is not practical.

For example, a solar array includes a plurality of solar panel installations. Each solar panel installation absorbs solar radiation and converts the solar radiation to electricity. In one embodiment, each solar panel installation generates a direct current that is communicated to combiner boxes before being communicated to power inverters wherein the direct current is converted to alternating current. In another embodiment, each solar panel installation has a micro-inverter that converts the current to alternating current which is then communicated to other solar electrical equipment. Accordingly, any conductor that carries current, direct or alternating, from a solar panel installation is, as used herein, a "current line." Generally, each current line extends away from the associated solar panel installation and is grouped with a bundle of similar current lines from other solar panel installations. Burying such current lines is too expensive and would make maintenance too expensive as well.

Similarly, it is too expensive to erect fifteen foot tall poles/towers and have the current lines elevated to that height. Thus, typically, the current lines are collected at the back of the solar panel installations and are secured to the structural support system, i.e., the frame, of each solar panel installation. In some embodiments, the solar panel installation frame has a special channel or slot structured to support the current lines. Such, channels or slots, however, are a problem in that the solar panel installation frame often defines a sharp edge. It is desirable that the current lines are not in direct contact with sharp metal edges or other obstructions that could cut or damage the current lines.

Further, one common practice in the industry is to use cable ties to bundle and secure the current lines. That is, the bundle of current lines is supported directly by the solar panel installation frame or by metal clips that attach to the solar panel installation frame. This configuration, however, also has problems. For example, if a new current line needs to be added to the bundle, the cable ties must be cut and, after the new current line is added to the bundle, reinstalled. Further, cutting the cable ties increases the chance that a current line will be accidentally cut or otherwise damaged.

One solution to utilizing the solar panel installation frames to support the current lines is the use of a messenger wire/cable hanger assembly. A cable hanger is a construct having a support coupling and supported element coupling. As used herein, a "support coupling" is a coupling that is structured to be coupled to a construct that maintains the cable hanger at an elevation above the ground/floor. Thus, for example, a coupling that is structured to be coupled to a pole or a messenger wire is a "support coupling." As used herein, a "supported element coupling" is a coupling structured to support a line that carries electricity such as, but not limited to, power lines and telephone lines. As used herein, a "messenger wire" is a line structured to support other lines. In an exemplary embodiment, a "messenger wire" has a greater strength than the lines it supports.

Thus, in a solar array the current lines are supported by a support assembly including a number of poles or piles (hereinafter, and collectively, "piles"), a messenger wire, and a number of cable hangers. That is, a number of piles provide elevated support points extending along a selected path adjacent the solar panel installations. The messenger wire is coupled to the piles at an elevated location. The cable hangers are then coupled to the messenger wire. The cable hangers are structured to support the current lines. This system also has problems. That is, while less expensive than taller poles/towers, the piles and messenger wire are also expensive and occupy the limited space adjacent the solar panel installations.

There is, therefore, a need for a device that supports current lines that does not include sharp edges. Further, there is a need for an improved cable hanger that does not require a messenger wire and piles for support. There is a further need for a current line management system that does not occupy additional space adjacent the solar panel installations.

SUMMARY OF THE INVENTION

These needs, and others, are met by at least one embodiment of the disclosed and claimed concept. As one aspect of the disclosed concept, a cable hanger structured to support a number of elongated current lines comprises: a body defining a support coupling and a number of supported element couplings, wherein said support coupling is a rigid element support coupling.

The rigid element support coupling may be one of a circular rigid element support coupling, a curvilinear rigid element support coupling, a regular convex polygonal rigid element support coupling or an irregular convex polygonal rigid element support coupling.

The body may be made from a generally rigid material and said rigid element support coupling may be a gripping rigid element support coupling. The gripping rigid element support coupling may be an outwardly flexing gripping rigid element support coupling.

Said support coupling may be structured to be coupled to an elongated support element; each said supported element coupling may be structured to be coupled to an elongated supported element; and each said supported element coupling may be structured to support an elongated supported element so that the longitudinal axis of each said supported element extends generally parallel to said elongated support element.

The support coupling may be generally planar.

Each supported element coupling may be one of a generally enclosed coupling, a partially encircling coupling, a generally helical coupling or a locking coupling.

The body may include a coating, and the coating may be disposed over substantially all of the body.

The body may be a unitary body.

The body may be a slightly flexible body.

As another aspect of the disclosed concept, a solar array comprises: a plurality of solar panel installations; each solar panel installation including a frame assembly and a number of output current lines; each said frame assembly including a number of support elements; a current line management system including a plurality cable hangers; each cable hanger including a body defining a support coupling and a number of supported element couplings; wherein said support coupling is a rigid element support coupling; wherein each cable hanger rigid element support coupling is coupled to a support element; and wherein each current line is coupled to a supported element coupling.

The rigid element support coupling may be one of a circular rigid element support coupling, a curvilinear rigid element support coupling, a regular convex polygonal rigid element support coupling or an irregular convex polygonal rigid element support coupling.

The body may be made from a generally rigid material, and the rigid element support coupling may be a gripping rigid element support coupling. The gripping rigid element support coupling may be an outwardly flexing gripping rigid element support coupling.

The support coupling may be structured to be coupled to an elongated support element; each supported element coupling may be structured to be coupled to an elongated supported element; and each supported element coupling may be structured to support an elongated supported element so that the longitudinal axis of each said supported element extends generally parallel to said elongated support element.

The support coupling may be generally planar.

Each supported element coupling may be one of a generally enclosed coupling, a partially encircling coupling, a generally helical coupling or a locking coupling.

The body may include a coating, and the coating may be disposed over substantially all of the body.

The body may be a unitary body.

The body may be a slightly flexible body.

These and other objects, features, and characteristics of the disclosed concept, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
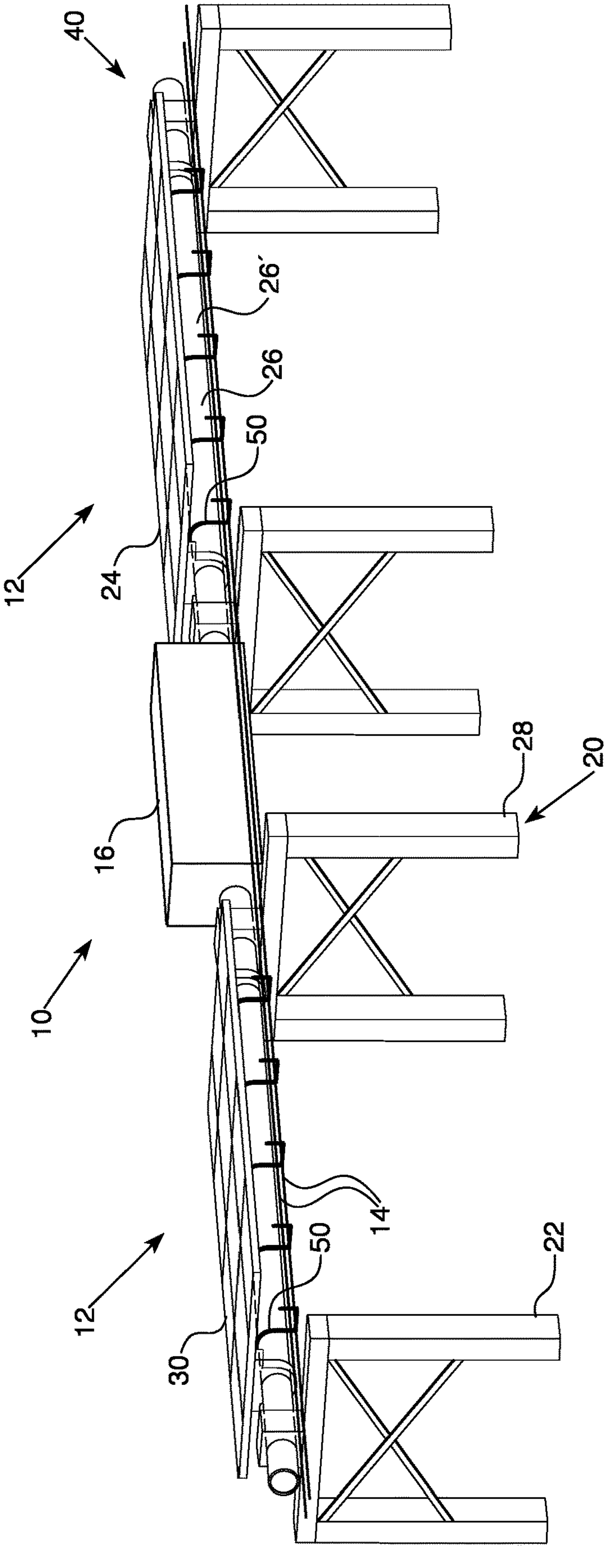
FIG. 1 is an isometric view of a solar array.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, in a term such as, but not limited to, "[X] structured to [verb] [Y]," the "[Y]" is not a recited element. Rather, "[Y]" further defines the structure of "[X]." That is, assume in the following two examples "[X]" is "a mounting" and the [verb] is "support." In a first example, the full term is "a mounting structured to support a flying bird." That is, in this example, "[Y]" is "a flying bird." It is known that flying birds, as opposed to swimming/walking birds, typically grasp a branch for support. Thus, for a mounting, i.e., "[X]," to be "structured" to support a flying bird, the mounting is shaped and sized to be something a flying bird is able to grasp similar to a branch. This does not mean, however, that the bird is being recited. In a second example, "[Y]" is a house; that is, the second exemplary term is "a mounting structured to support a house." In this example, the mounting is structured as a foundation as it is well known that houses are supported by foundations. As before, a house is not being recited, but rather defines the shape, size, and configuration of the mounting, i.e., the shape, size, and configuration of "[X]" in the term "[X] structured to [verb] [Y]."

As used herein, "associated" means that the elements are part of the same assembly and/or operate together, or, act upon/with each other in some manner. For example, an automobile has four tires and four hubcaps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component includes a nut (as well as an opening through which the bolt extends) or threaded bore.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place or wherein the motion of the object is otherwise limited. That is, for example, a book on a table is not coupled thereto because it may be moved in almost any direction (other than downwardly), but a book glued to a table is coupled thereto. Further, an object in a U-shaped hook is "coupled" to the hook because the object must be lifted upwardly to become separated from the hook. That is, the motion of the object is limited to the upward direction and, as such, and as used herein, the object is "coupled" to the U-shaped hook.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true. With regard to electronic devices, a first electronic device is "operatively coupled" to a second electronic device when the first electronic device is structured to, and does, send a signal or current to the second electronic device causing the second electronic device to actuate or otherwise become powered or active.

As used herein, "temporarily disposed" means that a first element(s) or assembly(ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours. With regard to elements/assemblies that are movable or configurable, "corresponding" means that when elements/assemblies are related and that as one element/assembly is moved/reconfigured, then the other element/assembly is also moved/reconfigured in a predetermined manner. For example, in a lever including a central fulcrum and elongated board, i.e., a "see-saw" or "teeter-totter," the board has a first end and a second end. When the board first end is in a raised position, the board second end is in a lowered position. When the board first end is moved to a lowered position, the board second end moves to a "corresponding" raised position. Alternately, a cam shaft in an engine has a first lobe operatively coupled to a first piston. When the first lobe moves to its upward position, the first piston moves to a "corresponding" upper position, and, when the first lobe moves to a lower position, the first piston, moves to a "corresponding" lower position.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, a "planar body" or "planar member" is a generally thin element including opposed, wide, generally parallel surfaces, i.e., the planar surfaces of the planar member, as well as a thinner edge surface extending between the wide parallel surfaces. That is, as used herein, it is inherent that a "planar" element has two opposed planar surfaces with an edge surface extending therebetween. The perimeter, and therefore the edge surface, may include generally straight portions, e.g., as on a rectangular planar member such as on a credit card, or be curved, as on a disk such as on a coin, or have any other shape.

As used herein, the word "unitary" means a component that is created as a single piece or unit. That is, a component that includes pieces that are created separately and then coupled together as a unit is not a "unitary" component or body.

As used herein, "unified" means that all the elements of an assembly are disposed in a single location and/or within a single housing, frame or similar construct.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to, or along, a central longitudinal axis of the cylinder.

As used herein, a "tension member" is a construct that has a maximum length when exposed to tension, but is otherwise substantially flexible, such as, but not limited to, a chain or a cable.

As used herein, "generally curvilinear" includes elements having multiple curved portions, combinations of curved portions and planar portions, and a plurality of linear/planar portions or segments disposed at angles relative to each other thereby forming a curve.

As used herein, an "elongated" element inherently includes a longitudinal axis and/or longitudinal line extending in the direction of the elongation.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally" means "in a general manner" relevant to the term being modified as would be understood by one of ordinary skill in the art.

As used herein, "substantially" means "by a large amount or degree" relevant to the term being modified as would be understood by one of ordinary skill in the art.

As used herein, "at" means on and/or near relevant to the term being modified as would be understood by one of ordinary skill in the art.

As shown in FIG. 1 a solar array 10 includes a number, or in an exemplary embodiment, a plurality, of solar panel installations 12 which are, in an exemplary embodiment, disposed in rows. As is known, each solar panel installation 12 includes a number of solar cells (not shown) and a frame assembly 20. Each solar panel installation 12, in an exemplary embodiment, also includes a drive assembly (not shown) that is structured to move a portion of the frame assembly 20 so that solar cells substantially face the sun as the sun moves across the sky. Each solar panel installation 12, in an exemplary embodiment, also includes various electronic devices (none shown) that regulate the collected electricity, control the drive assembly or which have other functions. Further, each solar panel installation 12 also includes a number of output current lines 14 (one shown for each solar panel installation 12). Further, in an exemplary embodiment, each solar panel installation 12 also includes a data transmission line (not shown) that is structured to, and does, carry an electrical signal incorporating data.

As the solar panel installations 12 are substantially similar, only one solar panel installation 12 is discussed below. In an exemplary embodiment, (wherein the solar panel installation 12 is structured to move the solar cells so as to face the sun) the frame assembly 20 includes a number of stationary or fixed frame members 22 and a number of movable frame members 24. As is known, each fixed frame member 22 and/or movable frame member 24 is structured to support other elements. As such, each fixed frame member 22 and/or movable frame member 24 is, as used herein, a "support element." That is, as used herein, a "support element" is a construct that is structured to, and does, support another construct or element. Thus, each frame assembly 20 includes a number of "support elements."

In an exemplary embodiment, the fixed frame members 22 include ground frame members 28 and support frame members 30. Generally, the ground frame members 28 are coupled, directly coupled, or fixed to the ground (or other substrate). The ground frame members 28 are further coupled or directly coupled to a torque tube 26. That is, one of the movable frame members 24 is identified herein as a torque tube 26. The torque tube 26 is movably coupled to the ground frame members 28. Further, a drive assembly 16 (shown schematically) is coupled to the torque tube 26. The drive assembly 16 is structured to, and does, rotate the torque tube 26 about its longitudinal axis. The support frame members 30 are coupled, directly coupled, or fixed to the torque tube 26 and move therewith. The solar cells are coupled, directly coupled, or fixed to the support frame members 30 such that the solar cells move with the rotation of the torque tube 26. Hence, the solar cells can be selectively directed toward the sun as the sun's position in the sky changes throughout the day by selectively rotating the torque tube 26 about its longitudinal axis using the drive assembly 16. It is noted that, in an exemplary embodiment, the frame members 22, 24, 26, 28, 30 are elongated bodies (not numbered) that inherently each include a longitudinal axis (not numbered).

As is known, the torque tube 26 (and/or other frame members 22, 24) is/are typically a hollow tube having a cross-sectional shape selected from the group including circular tubes 26' (FIGS. 1 and 2), curvilinear tubes (not shown), regular convex polygonal tubes 26" (FIG. 5), or irregular convex polygonal tubes (not shown). As used herein, a "circular tube" means tubes having a substantially circular cross-section. As used herein, "curvilinear tube" means tubes having a cross-sectional shape that includes a curved or arcuate portion. For example, a tube with an oval or obround cross-sectional shape is a "curvilinear tube." Further, a tube with a "D" shaped cross-section is a "curvilinear tube." As used herein, a "regular convex polygonal tube" means a tube with a non-circular, regular convex polygonal cross-section. As non-limiting examples, a tube with any of a square, pentagonal, hexagonal, or octagonal cross-section is a "regular convex polygonal tube." As used herein, an "irregular convex polygonal tube" means a tube with a non-circular, non-regular convex polygonal cross-section shape. As non-limiting examples, a tube with any of a rectangular, trapezoidal, or non-regular triangular cross-section is an "irregular convex polygonal tube." Further, some solar panel installations 12 utilize non-tubular elements to support the support frame members 30. That is, for example, rather than a circular torque tube 26, some solar panel installations 12 utilize an I-beam, a C-beam, or an L-beam to support the support frame members 30. Accordingly, as used herein, non-tubular elements used to support the support frame members 30 are included in the definition of "irregular convex polygonal tube." That is, as used herein, I-beams, C-beams, and L-beams, as well as non-tubular beams with other cross-sectional shapes are "irregular convex polygonal tubes."

The following discusses a current line management system 40 used in association with the solar panel installation 12 that is structured to move the solar cells so as to face the sun. That is, as discussed below, the current line management system 40 is used in association with a torque tube 26. It is understood, however, that the current line management system 40, in another exemplary embodiment, is used in association with any of the stationary or fixed frame members 22 or movable frame members 24.

Figure 2:
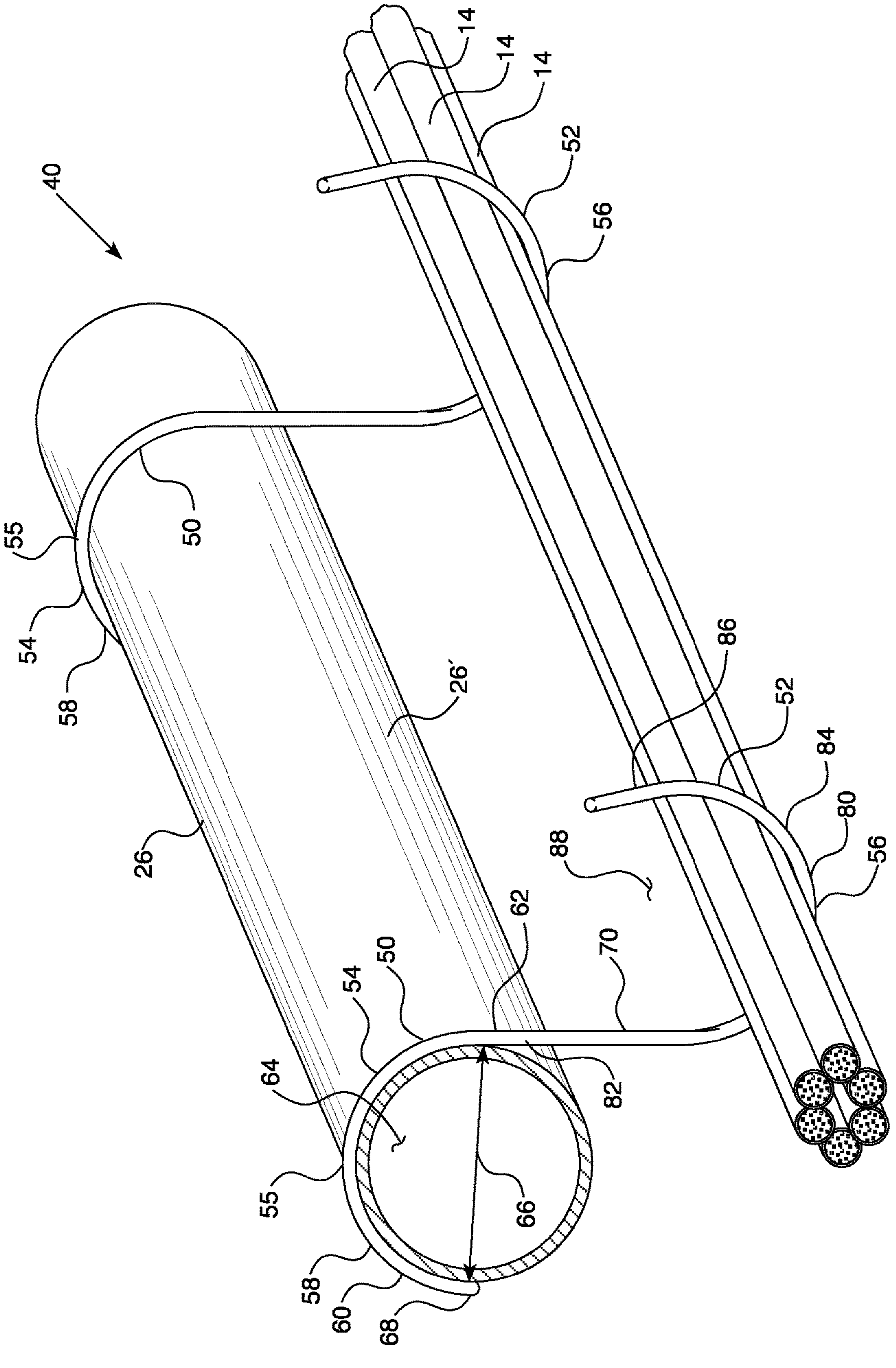
FIG. 2 is an isometric view of a current line management system.

As shown in FIGS. 1 and 2, a current line management system 40 includes a number, and typically a plurality, of cable hangers 50. Each cable hanger 50 is substantially similar and thus only one is described in detail below. Each cable hanger 50 includes a body 52 defining a support coupling 54 and a number of supported element couplings 56. As stated above, and as used herein, a "support coupling" is a coupling that is structured to be coupled to a construct that maintains the cable hanger at an elevation above the ground/floor. That is, a "support coupling" does not directly support, and is not directly coupled to, the current lines 14. As also stated above, and as used herein, a "supported element coupling" is a coupling structured to support a line that carries electricity such as, but not limited to, power lines and telephone lines. Thus, in this embodiment, and as used herein, a "supported element coupling" means the coupling that directly supports the current lines 14 or other lines.

The support coupling 54 is structured to be, and is, coupled, directly coupled, or fixed to a support such as, but not limited to, any of the frame members 22, 24, 26, 28, 30 discussed above. In an exemplary embodiment, the support coupling 54 is a "rigid element support coupling" 55. As used herein, a "rigid element support coupling" is a coupling that is structured to be supported by a substantially rigid, elongated element such as, but not limited to, members of the frame assembly 20 as described above. It is further noted that, as used herein, a messenger wire, which is a tension member, cannot be a "substantially rigid" element. Thus, a "rigid element support coupling" does not include a coupling that is structured to be coupled to a messenger wire. Further, a "rigid element support coupling" does not include a coupling that is structured to be coupled to a planar element such as, but not limited to, a wall.

As noted above, the torque tubes 26, or other frame members 22, 24, may have various cross-sectional shapes, e.g., circular, curvilinear, regular convex polygonal or irregular convex polygonal. Accordingly, the rigid element support coupling 55 has a shape that generally corresponds to, or snugly and generally corresponds to, the cross-sectional shape of the torque tubes 26, or other frame members 22, 24. Thus, in an exemplary embodiment, the rigid element support coupling 55 is one of a circular rigid element support coupling, a curvilinear rigid element support coupling, a regular convex polygonal rigid element support coupling or an irregular convex polygonal rigid element support coupling.

The rigid element support coupling 55 is, very broadly, shaped as an inverted U-shape. That is, the support coupling 54, and therefore the rigid element support coupling 55, includes a first portion 60 and a second portion 62 that are spaced thereby defining an enclosed space 64. The enclosed space 64 is generally, or substantially, shaped to correspond to the cross-sectional shape of the torque tube 26 (and/or other frame members 22, 24). Further, in an exemplary embodiment, the first portion 60 and the second portion 62 are disposed on opposite sides of the enclosed space 64. It is noted, however, that the first portion 60 and the second portion 62 are not structured to, and do not, form a closed loop. That is, in an exemplary embodiment, there is a gap 66 between the first portion 60 and the second portion 62.

Figure 3:
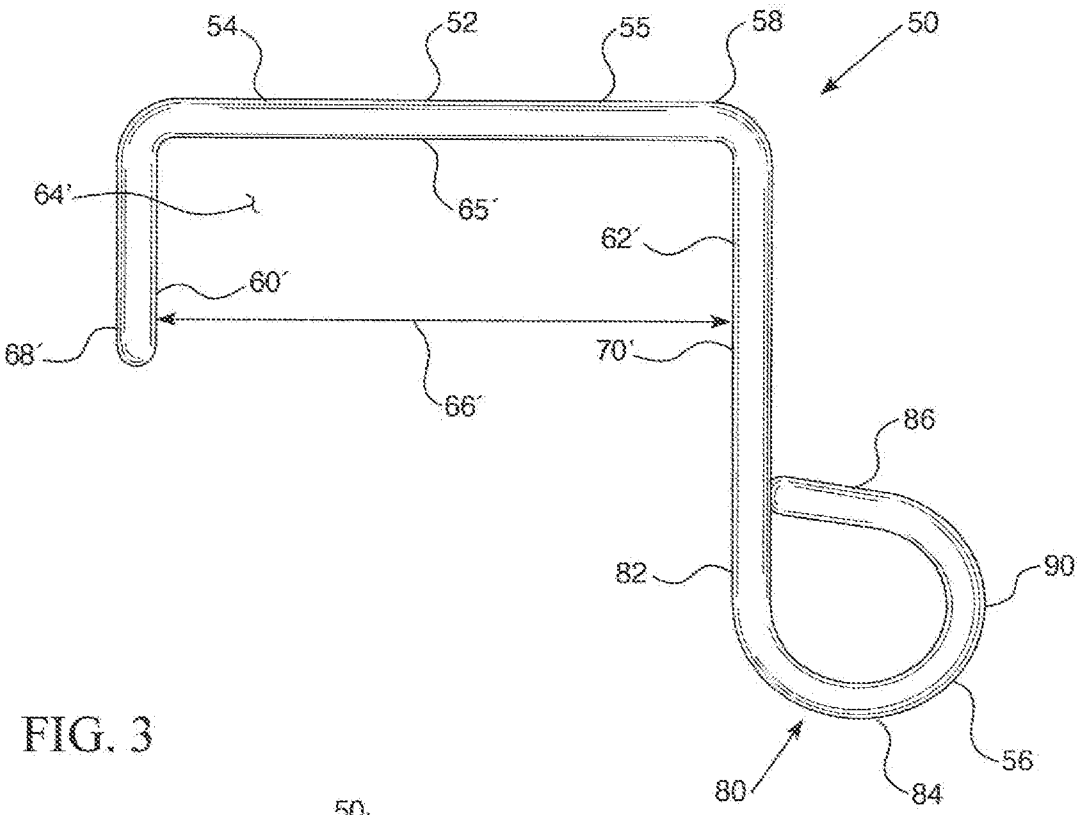
FIG. 3 is a front view of one embodiment of a cable hanger.
Figure 4:
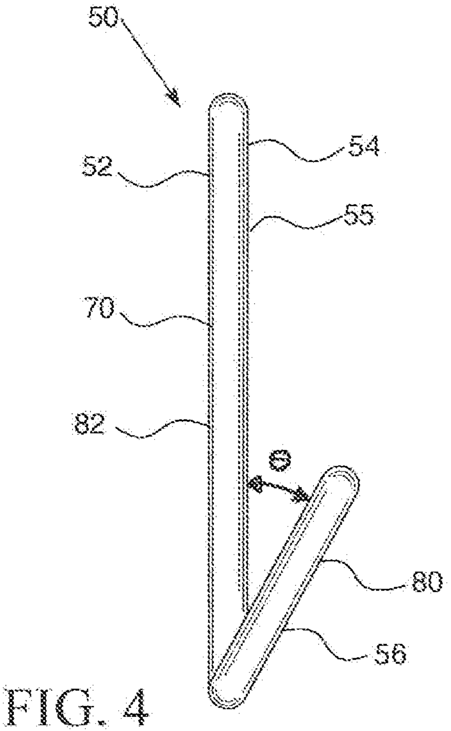
FIG. 4 is a side view of the cable hanger shown in FIG. 3.

For example, FIGS. 3 and 4 show a cable hanger body 52 with a support coupling 54, and therefore a rigid element support coupling 55, that is structured to be, and is, coupled to a torque tube 26 having a generally square (regular convex polygonal) cross-sectional shape, or, a torque tube 26 having a generally rectangular (irregular convex polygonal) cross-sectional shape. The support coupling 54 includes a generally straight, distal first portion 60' (distal relative to the supported element coupling 56, described below) and a generally straight, proximal second portion 62', as well as a generally straight connecting portion 65' extending between the first portion 60' and the second portion 62'. Thus, the support coupling 54 is generally shaped as an inverted, square "U." The enclosed space 64' between the first portion 60' and the second portion 62' generally, or substantially, corresponds to the width of a generally square/rectangular torque tube 26. Further, there is a gap 66' between a distal end 68' of the first portion 60' and a proximal end 70' of the second portion 62'.

Figure 5:
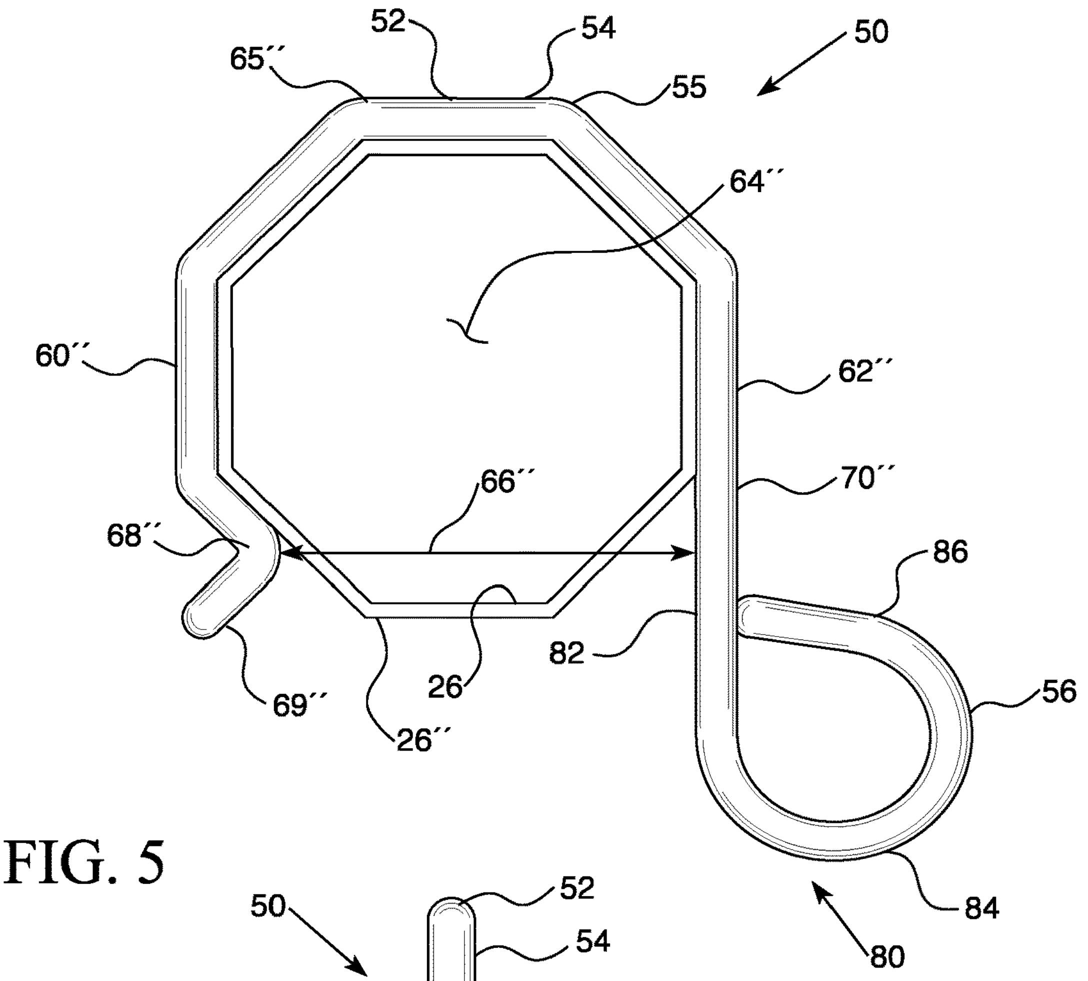
FIG. 5 is a front view of another embodiment of a cable hanger.
Figure 6:
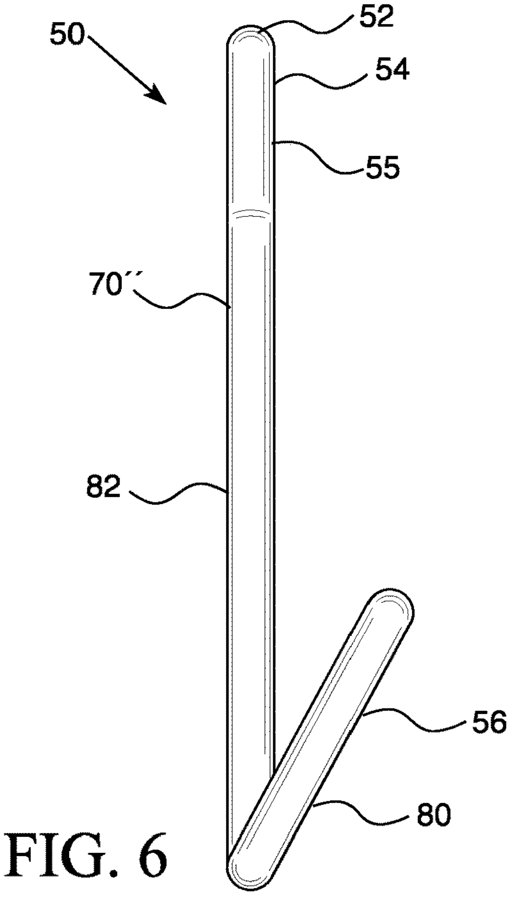
FIG. 6 is a side view of the cable hanger shown in FIG. 5.

In another exemplary embodiment, shown in FIGS. 5 and 6, the cable hanger body 52 has a support coupling 54, and therefore a rigid element support coupling 55, that is structured to be, and is, coupled to a torque tube 26 having a generally octagonal cross-sectional shape. In this embodiment, the support coupling 54 includes a generally straight, first portion 60" and a generally straight, second portion 62", as well as a connecting portion 64" extending between the first portion 60" and the second portion 62". In this embodiment, the connecting portion 65" includes three generally straight members (not individually numbered) that are disposed at an angle of about forty-five degrees to each other and to the first portion 60" and the second portion 62". Thus, the support coupling 54 is very generally shaped as an inverted "U." The enclosed space 64" between the first portion 60" and the second portion 62" generally, or substantially, corresponds to the width of a generally octagonal torque tube 26. Further, there is a gap 66" between a distal end 68" of the first portion 60" and a proximal end 70" of the second portion 62". Further, in this embodiment, an additional generally straight member 69" extends from the distal end 68" of first portion 60" at an angle of about ninety degrees. Thus, the support coupling 54 extends over six of the eight sides of the octagonal torque tube 26. As used herein, a support coupling 54 that extends at least partially over the majority of the sides of a polygonal element (such as, but not limited to, a polygonal torque tube 26) "generally corresponds" to the cross-sectional shape the polygonal element.

It is noted that, in an exemplary embodiment, the portions 60", 62", 64", and the other members, e.g., member 69", are all disposed generally in the same plane. That is, the support coupling 54, and therefore the rigid element support coupling 55, is a generally planar construct. As such, the angles noted above are measured in the plane generally defined by the support coupling 54. In another exemplary embodiment, not shown, the support coupling 54, and therefore the rigid element support coupling 55, is a generally helical construct.

Figure 7:
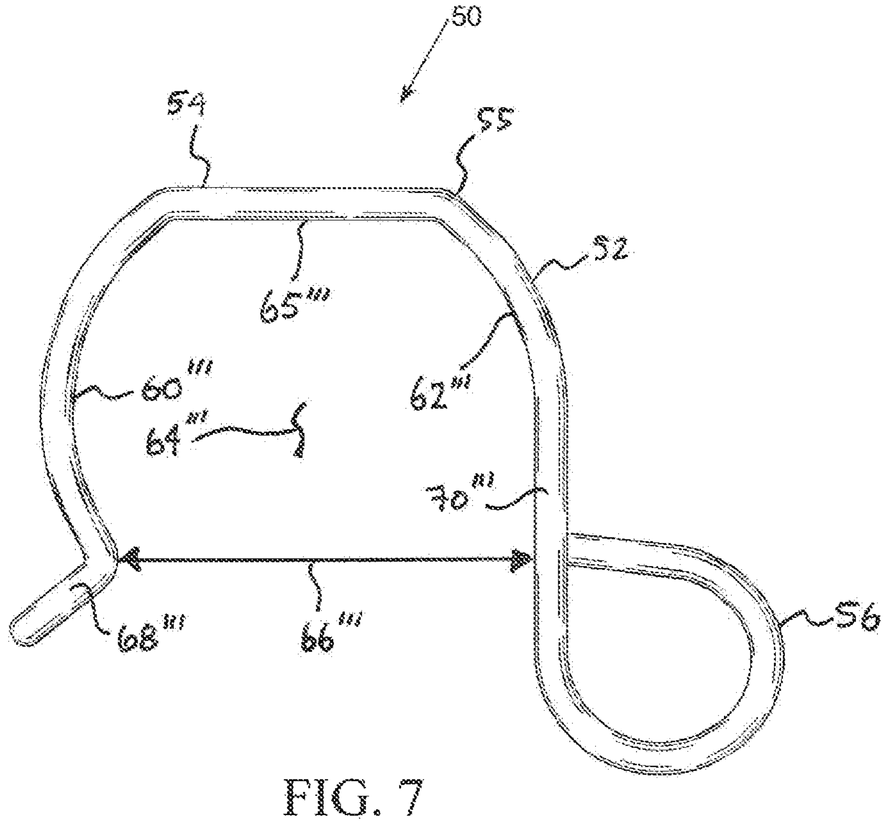
FIG. 7 is a front view of another embodiment of a cable hanger.

In another exemplary embodiment, shown in FIG. 7, the cable hanger body 52 has a support coupling 54, and therefore a rigid element support coupling 55, that is structured to be, and is, coupled to a torque tube 26 having a generally circular cross-sectional shape with a flat portion, or an obround (curvilinear) cross-sectional shape. That is, such an obround torque tube 26 would be oriented with the arcuate ends on the left and right sides. In this embodiment, the support coupling 54 includes a generally arcuate, distal first portion 60''' (distal relative to the supported element coupling 56, described below) and a generally arcuate, proximal second portion 62", as well as a generally straight connecting portion 65''' extending between the first portion 60' and the second portion 62'. Thus, the support coupling 54 is generally shaped as an inverted "U." The enclosed space 64''' between the first portion 60' and the second portion 62''' generally, or substantially, corresponds to the width of a generally circular or obround torque tube 26. Further, there is a gap 66' between a distal end 68' of the first portion 60''' and a proximal end 70''' of the second portion 62'''.

Figure 8:
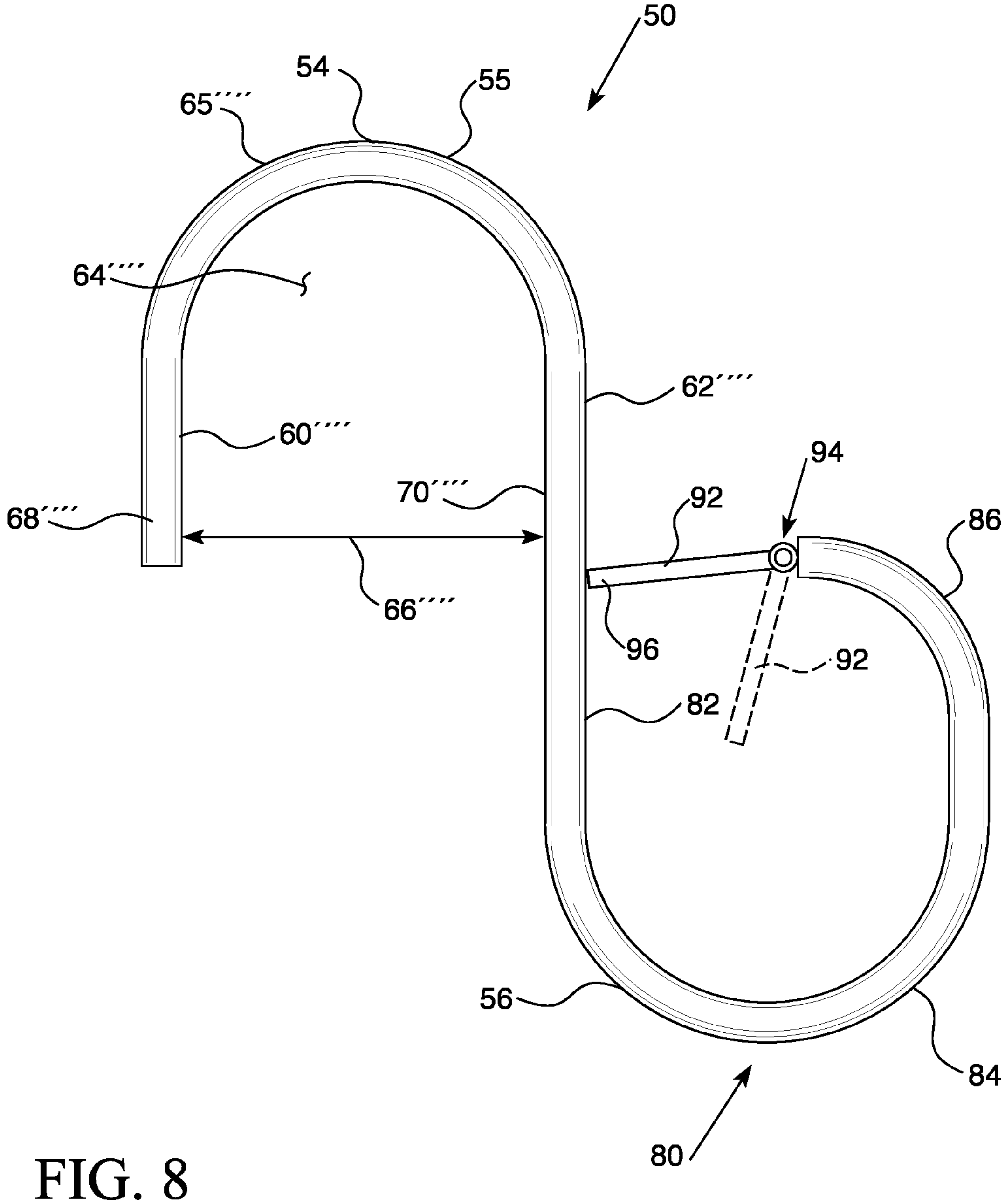
FIG. 8 is a front view of another embodiment of a cable hanger.
Figure 9:
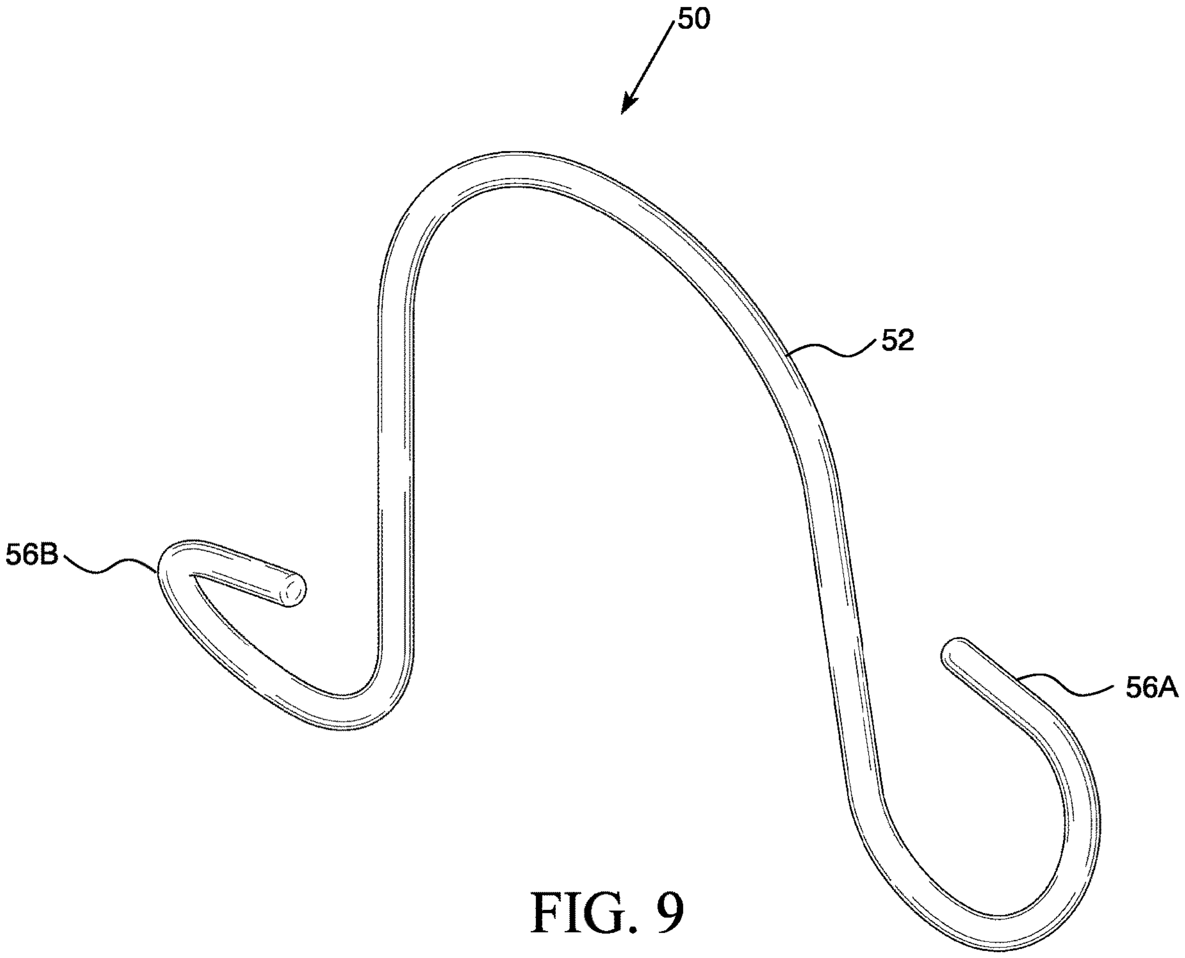
FIG. 9 is an isometric view of another embodiment of a cable hanger.
Figure 10:
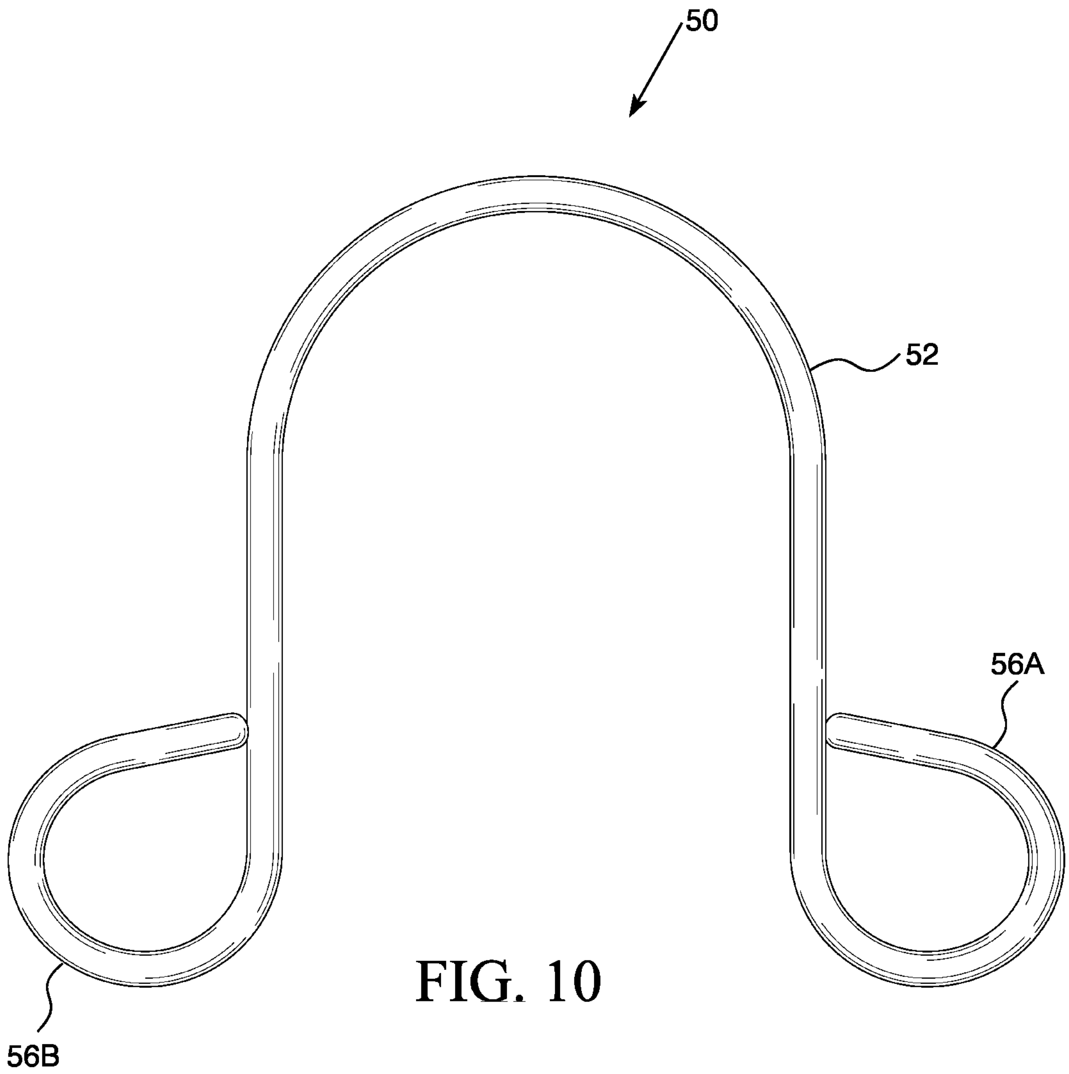
FIG. 10 is a front view of the cable hanger shown in FIG. 9.
Figure 11:
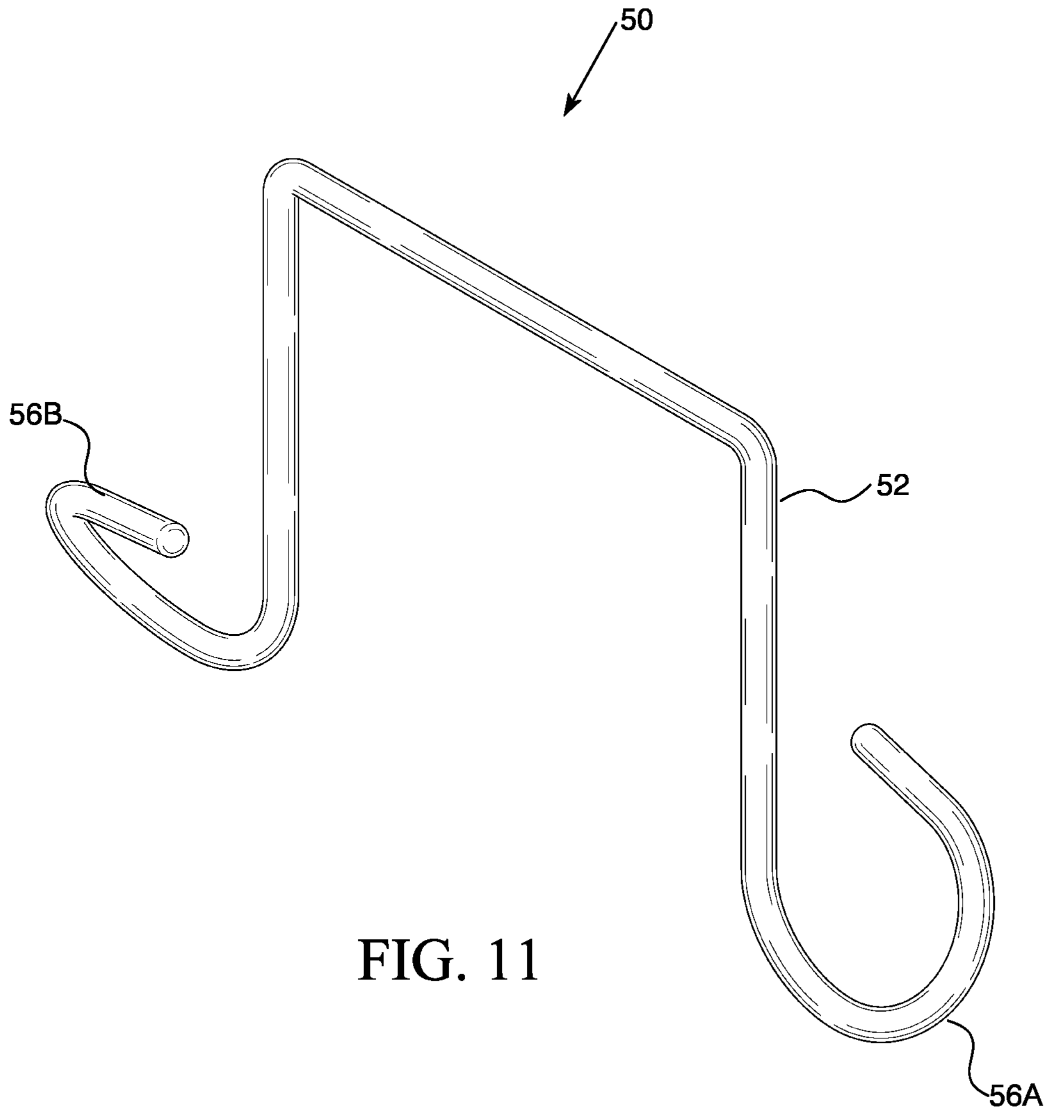
FIG. 11 is an isometric view of another embodiment of a cable hanger.
Figure 12:
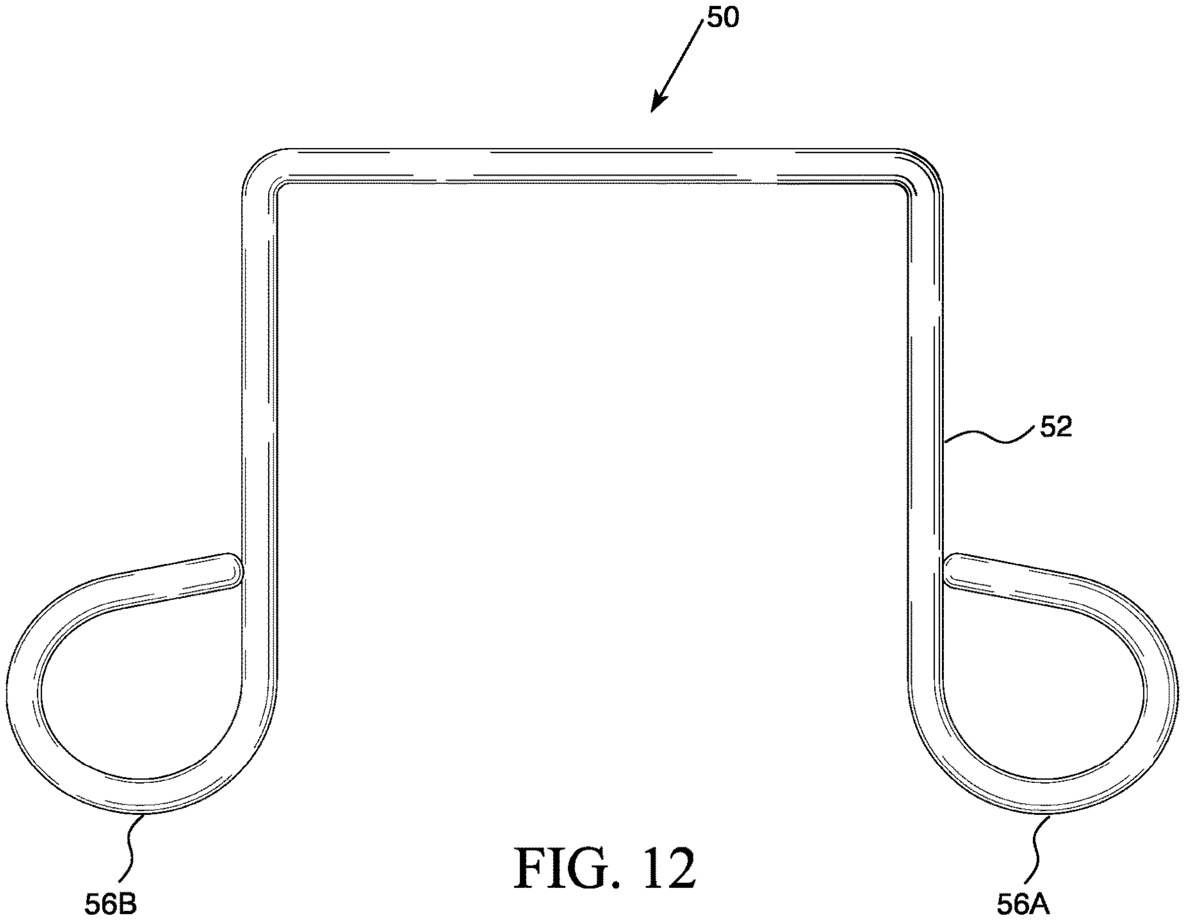
FIG. 12 is a front view of the cable hanger shown in FIG. 11.
Figure 13:
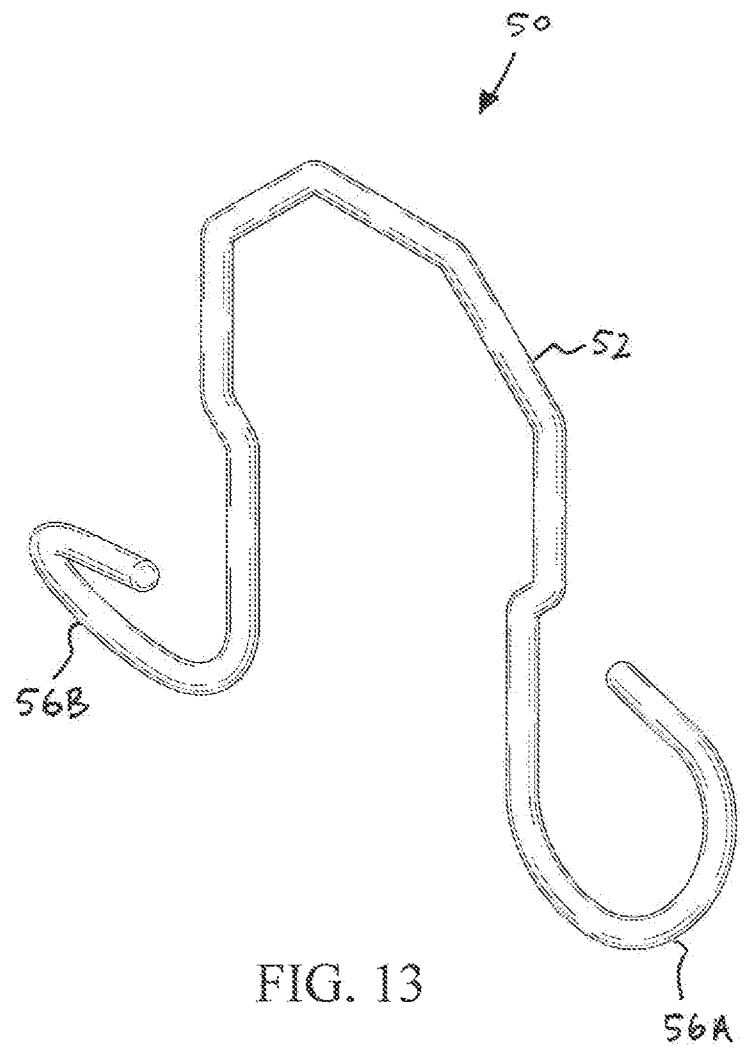
FIG. 13 is an isometric view of another embodiment of a cable hanger.
Figure 14:
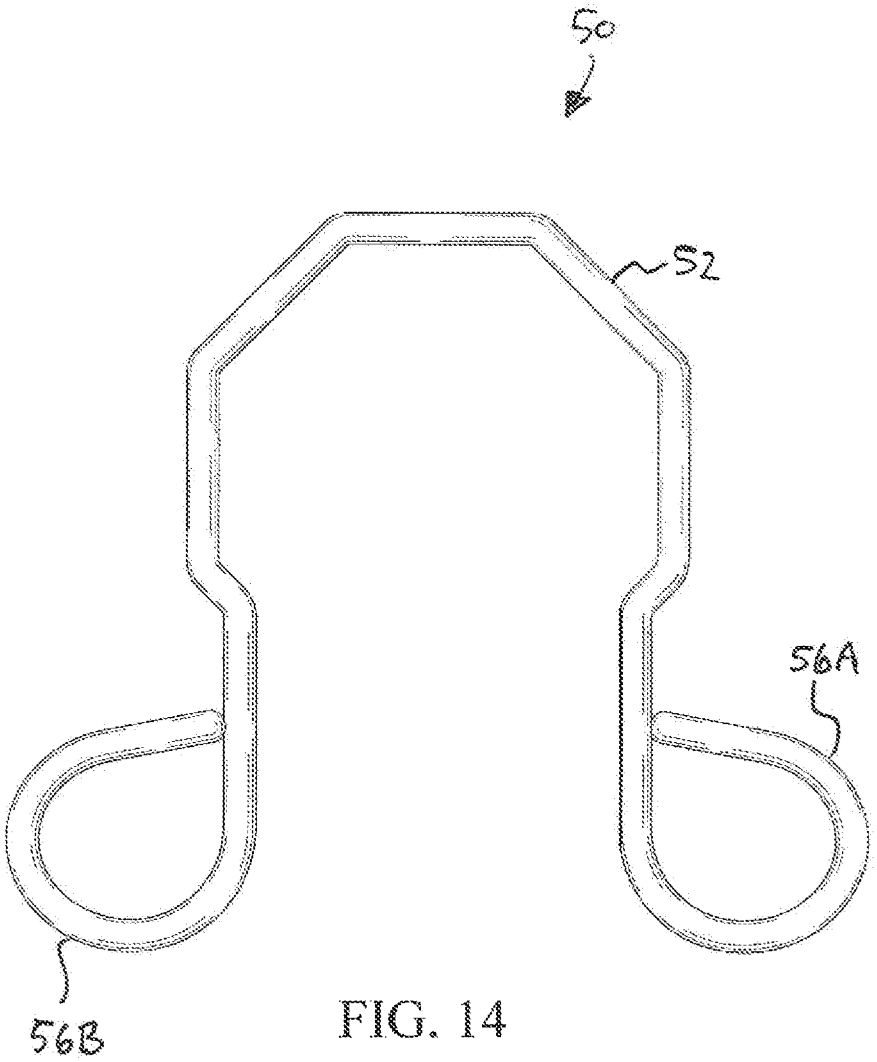
FIG. 14 is a front view of the cable hanger shown in FIG. 13.

As shown in FIG. 8, in another embodiment, the cable hanger body 52 has a support coupling 54, and therefore a rigid element support coupling 55, that is structured to be, and is, coupled to a torque tube 26 having a generally circular cross-sectional shape or an obround (curvilinear) cross-sectional shape. That is, such an obround torque tube 26 would be oriented with the arcuate ends on the top and bottom. The support coupling 54 includes a generally straight, distal first portion 60"" (distal relative to the supported element coupling 56, described below) and a generally straight, proximal second portion 62"", as well as a generally arcuate connecting portion 65"" extending between the first portion 60"" and the second portion 62"". Thus, the support coupling 54 is generally shaped as an inverted "U." The enclosed space 64"" between the first portion 60"" and the second portion 62"" generally, or substantially, corresponds to the width of a generally circular or obround torque tube 26. Further, there is a gap 66"" between a distal end 68"" of the first portion 60"" and a proximal end 70"" of the second portion 62"".

In an exemplary embodiment, the cable hanger body 52 is configured in a "slightly flexible" configuration. As used herein, a body in a "slightly flexible configuration" means that the body is resilient, i.e., the body returns to its original shape when no bias is applied, and that flexes under a force of between about 5.0 lbf and 10.0 lbf. In an exemplary embodiment, the cable hanger body 52 is made from 0.187" GALV Class 3 CHQ Steel Wire. A cable hanger body 52 made from 0.187" GALV Class 3 CHQ Steel Wire is structured to be, and is, flexible by a human. Thus, as described above, the rigid element support coupling 55 is structured to be, and is, movable between a first configuration, wherein the rigid element support coupling 55 is not flexed and has a minimal enclosed space 64, and, a second configuration, wherein the rigid element support coupling 55 is flexed and has an increased enclosed space 64. It is understood that the terms "minimal enclosed space" and "increased enclosed" are relative to each other.

The following example of use refers to the cable hanger body 52 as shown in FIG. 3 and as discussed above. It is understood that the other embodiments are installed in a similar manner. In use, the support coupling 54, and therefore a rigid element support coupling 55, is disposed over the torque tube 26 and, as needed, the support coupling 54 is flexed so as to make the space between the first portion 60 and the second portion 62 larger. That is, the support coupling 54 is moved between the first and second configurations as needed so as to fit over the torque tube 26. Once the support coupling 54 is in place, the bias to the support coupling 54 is released. In this configuration, the support coupling 54 "grips" the torque tube 26. That is, as used herein, a "gripping" support coupling, or rigid element support coupling, means a support coupling that applies a bias to the support to which the support coupling is coupled. In an exemplary embodiment, the support coupling 54, and therefore a rigid element support coupling 55, is a "gripping" support coupling 54, or a "gripping" rigid element support coupling 55. Further, as used herein, an "outwardly flexing gripping rigid element support coupling" means a rigid element support coupling 55 that is pulled apart, i.e., bias in generally opposite directions, is applied to two portions of the rigid element support coupling 55. Thus, as described above, the rigid element support coupling 55 is an outwardly flexing gripping rigid element support coupling 58.

The supported element coupling 56 is structured to be, and is, coupled to, and supports, a number of current lines 14. As shown in FIG. 2, in one embodiment, the supported element coupling 56 is generally a U-shaped hook 80 having a proximal end 82 a bight 84, and a distal end 86. In this configuration, the hook 80 defines an enclosed space 88 which, as used herein, is the space bound by the hook 80. In an exemplary embodiment, the supported element coupling proximal end 82 is unitary with the support coupling 54 and, as shown, the support coupling proximal end 70. Thus, in an exemplary embodiment, the cable hanger body 52 is a unitary body.

In an exemplary embodiment, the hook proximal end 82 and the hook distal end 86 are generally straight. Further, the hook bight 84 is generally arcuate and extends over an arc of about one hundred and eighty degrees, about one hundred and twenty degrees, or about two hundred and seventy degrees. When the hook bight 84 extends over an arc of about one hundred and eighty degrees, the hook proximal end 82 and the hook distal end 86 are generally parallel and the hook 80 is substantially U-shaped. As used herein, such a hook 80 (or supported element coupling 56), i.e., one where the hook proximal end 82 and the hook distal end 86 are generally parallel, is a "generally enclosed coupling."

When the hook bight 84 extends over an arc greater than one hundred and eighty degrees, such as shown in FIG. 3, the hook 80 is shaped generally as a teardrop which, as used herein, is also "generally a U-shaped." That is, as used herein, a "teardrop shape" means a shape that is pointed at the top and round at the bottom. Thus, the hook proximal end 82 and the hook distal end 86 are angled toward each other. Further, such a hook 80 (or supported element coupling 56), i.e., one where the hook proximal end 82 and the hook distal end 86 are angled toward each other, is, as used herein, a "partially encircling coupling."

In another embodiment, not shown, the hook distal end 86 is curvilinear and/or arcuate.

Further, in another embodiment, the supported element coupling 56, i.e., hook 80, is also generally helical. This shape is sometimes colloquially identified as a "pig tail" shape. As used herein, a "generally helical" coupling means that the body defining the coupling extends over an arc of more than three hundred and sixty degrees and is in the form of a helix, i.e., a spiral. That is, a "generally helical" supported element coupling 56 is structured to, and does, encircle the number of current lines 14. Stated alternately, a "generally helical" supported element coupling 56 is structured to, and does, extend about the number of current lines 14. Further, because the hook distal end 86 does not connect to the hook proximal end 82, this shape is, as used herein, "generally U-shaped."

In another embodiment, shown in FIG. 8, the supported element coupling 56 includes a locking construct such as, but not limited to, a spring-hinged element 92 similar to a carabiner. That is, for example, the hook distal end 86 is coupled by a spring biased hinge 94 to the element 92 and a distal tip 96 of the element 92 engages another portion of the hook 80, e.g., hook proximal end 82.

Further, in an exemplary embodiment, the U-shaped hook 80 is either partially helical or is angled relative to the plane of the support coupling 54. When the U-shaped hook 80 is partially helical, not shown, the U-shaped hook 80 extends in a helical manner, i.e., in a spiral manner, but does not extend over an arc of three hundred and sixty degrees or more. That is, as used herein, a "partially helical" element extends in a helical manner, i.e., in a spiral manner, but does not extend over an arc of three hundred and sixty degrees or more.

When the U-shaped hook 80 is angled relative to the plane of the support coupling 54, as shown in FIGS. 4 and 6, the hook 80, i.e., the hook bight 84, and the hook distal end 86, are generally disposed in a plane and that plane is at an angle θ relative to the plane of the support coupling 54. In an exemplary embodiment, the two aforementioned planes are positioned at 30° with respect to each other. In other example embodiments the two aforementioned planes are positioned within a range of 20°-40° with respect to each other. In other example embodiments, the two aforementioned planes are angled with respect to each other so as to size the gap (not numbered) between the hook proximal end 82 and the hook distal end 86 such that the largest supported current line 14 is just able to pass therethrough. In these configurations, the support coupling 54 is structured to be coupled to an elongated support element, i.e., the frame members 22, 24, 26, 28, 30. Further, the supported element coupling 56 is structured to be coupled to an elongated supported element, i.e., the number of current lines 14. Thus, each supported element coupling 56 is structured to support the elongated supported element, i.e., the number of current lines 14, so that the longitudinal axis of each supported element extends generally parallel to the elongated support element, i.e., the frame members 22, 24, 26, 28, 30.

In an exemplary embodiment, the cable hanger body 52 is protected by a coating 90 (FIG. 3) such as, but not limited to, PVC plastisol. As is known, plastisol is high dielectric grade, UV stabilized and flame retardant coating. In an exemplary embodiment, the coating 90 is about eighty MILS thick. The coating protects the cable hanger body 52 from the environment and protects the current lines 14 from abrading against the cable hanger body 52. A cable hanger body 52 with coating 90 is, as used herein, a "unified body."

Further, in exemplary embodiments, such as shown in FIGS. 9-14, the number of supported element couplings 56 defined by the body 52 of the cable hanger 50 may include a first supported element coupling 56A defined by a first end of the body 52 and a second supported element coupling 56B defined by a second of the body 52 opposite the first end. The remainder of the cable hanger 50 between such supported element couplings 56A and 56B may be correspondingly shaped so as to fit any of the different shaped torque tubes 26 or other frame members such as previously described herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A cable hanger structured to support a number of elongated current lines, said cable hanger comprising:
- a body defining a support coupling and a number of supported element couplings,
- wherein said support coupling is a rigid element support coupling, and
- wherein said support coupling is structured to be fixedly coupled with a torque tube of a solar panel installation.

2. The cable hanger of claim 1 wherein said rigid element support coupling is a regular convex polygonal rigid element support coupling.

3. The cable hanger of claim 1 wherein:
- said body is made from a generally rigid material; and
- wherein said rigid element support coupling is a gripping rigid element support coupling.

4. The cable hanger of claim 3 wherein said gripping rigid element support coupling is an outwardly flexing gripping rigid element support coupling.

5. The cable hanger of claim 1 wherein:
- said support coupling is structured to be coupled to an elongated support element;
- each said supported element coupling is structured to be coupled to an elongated supported element; and
- wherein each said supported element coupling is structured to support an elongated supported element so that the longitudinal axis of each said supported element extends generally parallel to said elongated support element.

6. The cable hanger of claim 1 wherein said support coupling is generally planar.

7. The cable hanger of claim 1 wherein each said supported element coupling is a generally enclosed coupling.

8. The cable hanger of claim 1 wherein:
- said body includes a coating; and
- said coating disposed over substantially all of said body.

9. The cable hanger of claim 1 wherein said body is a unitary body.

10. The cable hanger of claim 1 wherein said body is a slightly flexible body.

11. The cable hanger of claim 1 wherein each said supported element coupling is a partially encircling coupling.

12. The cable hanger of claim 1 wherein each said supported element coupling is a generally helical coupling.

13. The cable hanger of claim 1 wherein each said supported element coupling is a locking coupling.

14. The cable hanger of claim 8, wherein the coating comprises a PVC plastisol.

15. An arrangement structured to support a number of elongated current lines along a rotatable torque tube supporting a number of solar panels, the arrangement comprising:
- the torque tube; and
- a cable hanger comprising a body defining a support coupling and a number of supported element couplings,
- wherein said support coupling is a rigid element support coupling, and
- wherein said support coupling is rigidly coupled with the torque tube.

* * * * *